Figure 2:
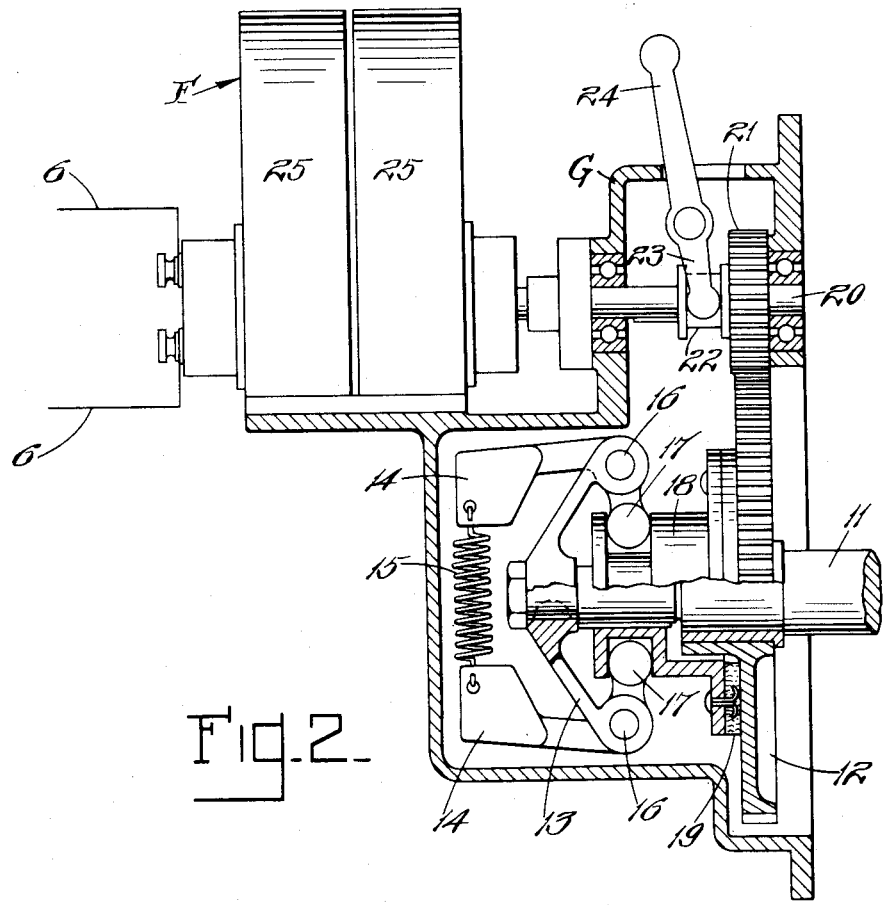

Dec. 26, 1922. 1,440,051
S. G. BAITS.
STARTING GENERATOR FOR INTERNAL COMBUSTION ENGINES
FILED Nov. 12, 1920.

INVENTOR:
Stuart G. Baits
by Macleod, Calvin, Copeland & Dike
Attys.

Patented Dec. 26, 1922.

1,440,051

UNITED STATES PATENT OFFICE.

STUART G. BAITS, OF DETROIT, MICHIGAN, ASSIGNOR TO ESSEX MOTORS, OF DETROIT, MICHIGAN, A CORPORATION OF MICHIGAN.

STARTING GENERATOR FOR INTERNAL-COMBUSTION ENGINES.

Application filed November 12, 1920. Serial No. 423,552.

*To all whom it may concern:*

Be it known that I, STUART G. BAITS, a citizen of the United States, residing at Detroit, county of Wayne, State of Michigan, have invented a certain new and useful Improvement in Starting Generators for Internal-Combustion Engines, of which the following is a specification, reference being had therein to the accompanying drawings.

My invention relates to means for supplying current for ignition purposes to combustion engines at speeds below which the ordinary generator fails to deliver current and at times when the battery is inoperative. At the present time, many automobiles, motor boats, airplanes and the like are supplied with what are known as battery ignition systems. These systems include a storage battery, a direct current generator and a regulator which governs the action of the generator, cutting it out so that it does not charge the battery at speeds below 300 to 500 revolutions per minute. In starting and when the engine is running at speeds below the lower limit of operation of the main generator, the ignition current is derived from the battery. The battery also furnishes a current for exciting the field of the main generator. This electrical apparatus is very satisfactory under ordinary circumstances, but its operation is altogether dependent upon the battery. If the battery fails for any cause whatever, the entire system is useless because the engine cannot be revolved by a hand crank at speeds sufficiently great to cause the main generator to begin to operate.

These difficulties are not serious in thickly settled places where fresh batteries can be easily obtained, but in sparsely settled countries they become serious, because when a battery fails, it is impossible to start the engine.

Accordingly, I combine with the ordinary ignition set, which includes a main generator and a storage battery, a very small direct current generator having permanent field magnets and geared to a shaft of the engine so that it will make two or more revolutions for each revolution of the engine. I also provide automatic means for disconnecting the auxiliary generator when the speed of the engine has attained a predetermined point. The auxiliary generator operates when the engine is cranked by hand and at low speeds and furnishes current for ignition and excites the field of the main generator. The automatic clutch throws in the auxiliary generator whenever the speed of the engine drops below a predetermined figure and, therefore, it is possible to operate the machine without the battery, even though the electric self-starter will not turn over the engine.

The invention will be fully understood from the following description when taken in connection with the accompanying drawings, and the novel features thereof will be pointed out and clearly defined in the claims at the close of this specification.

Figure 1:
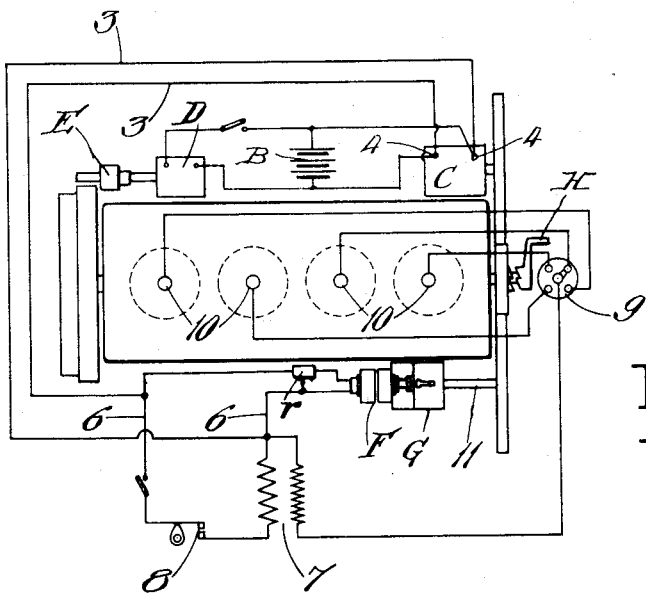

In the drawings, Fig. 1 is a diagrammatic plan view showing an internal combustion engine provided with a storage battery, a main generator, a self-starter and an auxiliary direct current generator.

Fig. 2 is a sectional view of the auxiliary generator and the mechanical connections by which it is driven.

Referring now to the drawings at A is shown an internal combustion engine having a hand crank H. At B is shown a battery, at C a main generator and at D an electrical self-starting motor geared to the flywheel in the well-known manner, as shown at E. At 11 is shown a shaft forming part of the engine. In practice, this may be the water pump shaft or cam shaft. On this shaft in a casing G is a main gear 12 which is loosely mounted and, therefore, does not revolve with the engine except when connected thereto by mechanism, which will now be described.

On the end of the shaft is a governor which includes a spider 13 fixed to the end of the shaft. This spider carries a pair of weights 14 connected by a spring 15 and formed integral with elbow levers pivoted at 16. The inner ends 17 of said elbow levers engage a clutch hub 18 which is slidable longitudinally on the shaft 11 and keyed thereto. This clutch hub carries a plate 19 of leather or other frictional material and this plate is located adjacent the side of the gear 12 so that it may be brought forcibly into contact with it, thereby causing the gear 12 to rotate with the shaft 11. At 20 is shown another shaft on which is mounted a pinion 21 which is splined thereto and movable lengthwise of the shaft. This pinion 21 is provided with a collar 22 engaged by the fork 23 of a hand shifter lever 24. By this means, the pinion 21 may be slid lengthwise of the shaft to engage with or disengage it from the gear 12 of the shaft 11. On the shaft 20 is a direct current generator F having preferably field magnets 25, 25 and connected to the ignition system of the engine by the wires 6, 6, a spark coil being shown at 7, an interrupter or breaker at 8, a distributor at 9 and spark plugs at 10, these parts being of the ordinary well-known construction heretofore commonly employed in battery-operated internal combustion engines.

The governor is so designed that when the engine is at rest or running at a speed below that at which the main generator C becomes operative, the gear 12 will be fixed to the shaft 11 and, therefore, the parts will be connected up to operate the auxiliary generator. Therefore, in case the battery has failed and it is impossible to use the self-starter to start the engine, the operator can turn the engine over with the ordinary hand crank. This relatively slow rotation of the engine will cause the armature of the direct current generator to rotate with speeds sufficient to produce a spark at the plugs 10 and start the engine. Thereupon, the direct current generator will continue to supply current to the ignition system until the predetermined speed has been reached and the governor has disconnected the gear 12 from the shaft 11. Thereupon, the auxiliary generator will stop and the engine will be supplied from the main generator or battery. The auxiliary generator will also furnish current for ignition purposes when the engine speed drops below the predetermined speed. Under ordinary conditions when the battery is in good working order, the auxiliary generator will be disconnected from the engine by the hand lever 24 so that it will be stationary at all speeds of the engine. This eliminates unnecessary load of the auxiliary generator, loss of power and any noise which its operation may produce.

At 3—3 are shown wires leading from the feed wires 6—6 to the field terminals 4—4 of the main generator. By means of these wires the current from the auxiliary generator may be used to excite the field of the main generator. When the auxiliary generator is disconnected from the engine, a reverse current cut-out, as shown at $r$, prevents the battery from operating this generator as a motor. When the auxiliary generator is out of operation the field of the main generator receives excitation from the battery.

What I claim is,—

1. In combination with an internal combustion engine, a direct current generator, gearing actuated by the engine so that the generator will revolve at speed greater than that of the engine, and automatically acting means to disconnect the generator when a predetermined speed is reached.

2. In combination with an internal combustion engine, a direct current generator, gearing so that the generator will revolve at speed greater than that of the engine, a governor, and a clutch controlled by the governor to disconnect the generator from the engine when a predetermined speed is reached.

3. In combination with an internal combustion engine, a direct current generator having permanent field magnets, gearing actuated by the engine so that the generator will revolve at speed greater than that of the engine, and automatically acting means to disconnect the generator when a predetermined speed is reached.

4. In combination with an internal combustion engine, a gear loosely mounted on a shaft of the engine, a clutch to connect said gear and said shaft, a governor to operate said clutch, a direct current generator, a shaft therefor, and a hand-operated means for disconnecting the generator from the gear on the engine shaft.

5. The combination with an internal combustion engine having the usual battery-operated ignition system, electric self-starter, and a main generator to charge the battery, of an auxiliary direct current generator having a permanent field, and gearing between said auxiliarly generator and a shaft of the engine by which said generator shall be driven at speed greater than that of the engine.

In testimony whereof I affix my signature.

STUART G. BAITS.